United States Patent [19]

Harris

[11] Patent Number: 4,790,349
[45] Date of Patent: Dec. 13, 1988

[54] TANK PRESSURE CONTROL SYSTEM

[75] Inventor: Robert S. Harris, Connersville, Ind.

[73] Assignee: Stant Inc., Connersville, Ind.

[21] Appl. No.: 177,126

[22] Filed: Apr. 4, 1988

[51] Int. Cl.[4] ............................................. F16K 24/00
[52] U.S. Cl. ...................................... 137/587; 137/393; 220/86 R; 220/85 VR; 220/85 VS; 141/46
[58] Field of Search .............................. 137/587, 393; 220/85 VR, 85 VS, 86 R; 141/44, 46, 308

[56] References Cited

U.S. PATENT DOCUMENTS

| | | | |
|---|---|---|---|
| 2,860,656 | 11/1958 | Eshbaugh | 137/587 X |
| 3,062,246 | 11/1962 | Koehler | 220/86 R X |
| 3,363,642 | 1/1968 | Mylander | 137/393 |
| 3,606,908 | 9/1971 | Riester | 137/587 X |
| 3,744,516 | 7/1973 | Rowe | 137/587 |
| 3,771,690 | 11/1973 | Hunter | 220/85 VR |
| 3,907,153 | 9/1975 | Mutty | 137/587 X |
| 4,036,255 | 7/1977 | Wilson | 137/587 |
| 4,191,208 | 3/1980 | Mylander | 137/393 |
| 4,292,996 | 10/1981 | Pataki et al. | 137/393 |
| 4,405,000 | 9/1983 | Fuller | 137/393 |
| 4,416,108 | 11/1983 | Ghandhi | 56/17.5 |
| 4,444,222 | 4/1984 | Yamagiwa | 137/393 |
| 4,706,708 | 11/1987 | Fornuto et al. | 137/588 |
| 4,714,171 | 12/1987 | Sasaki et al. | 220/85 VR |
| 4,715,509 | 12/1987 | Ito et al. | 220/86 R |

FOREIGN PATENT DOCUMENTS 2743490 4/1979 Fed. Rep. of Germany ...... 137/587

Primary Examiner—John Rivell
Attorney, Agent, or Firm—Barnes & Thornburg

[57] ABSTRACT

An apparatus is provided for controlling discharge of fuel vapor from the fuel tank having a filler neck during refueling. The apparatus includes a passage for conducting fuel vapor between the fuel tank and a distal portion of the filler neck and a valve for selectively blocking flow of fuel vapor through the conducting means. The valve is operable between a flow-blocking position and a flow-delivery position. A spring yieldably biases the blocking means away from its flow-blocking position to a flow-delivery position. An assembly defining a venting control chamber in communication with the valve is provided for using liquid fuel in the fuel tank to develop a pressure head in the venting control chamber having a magnitude in excess of a predetermined threshold level to exert a closing force on the valve in opposition to the spring so that the valve is moved to its flow-blocking position, thereby preventing discharge of pressurized fuel vapor in the tank to the filler neck through the passage.

31 Claims, 2 Drawing Sheets

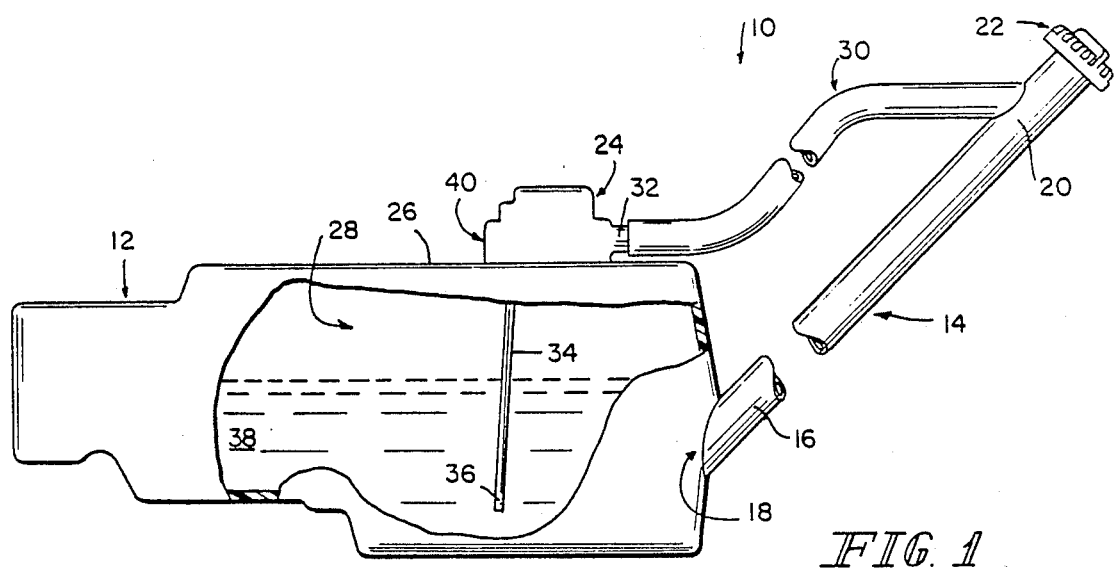
FIG. 1
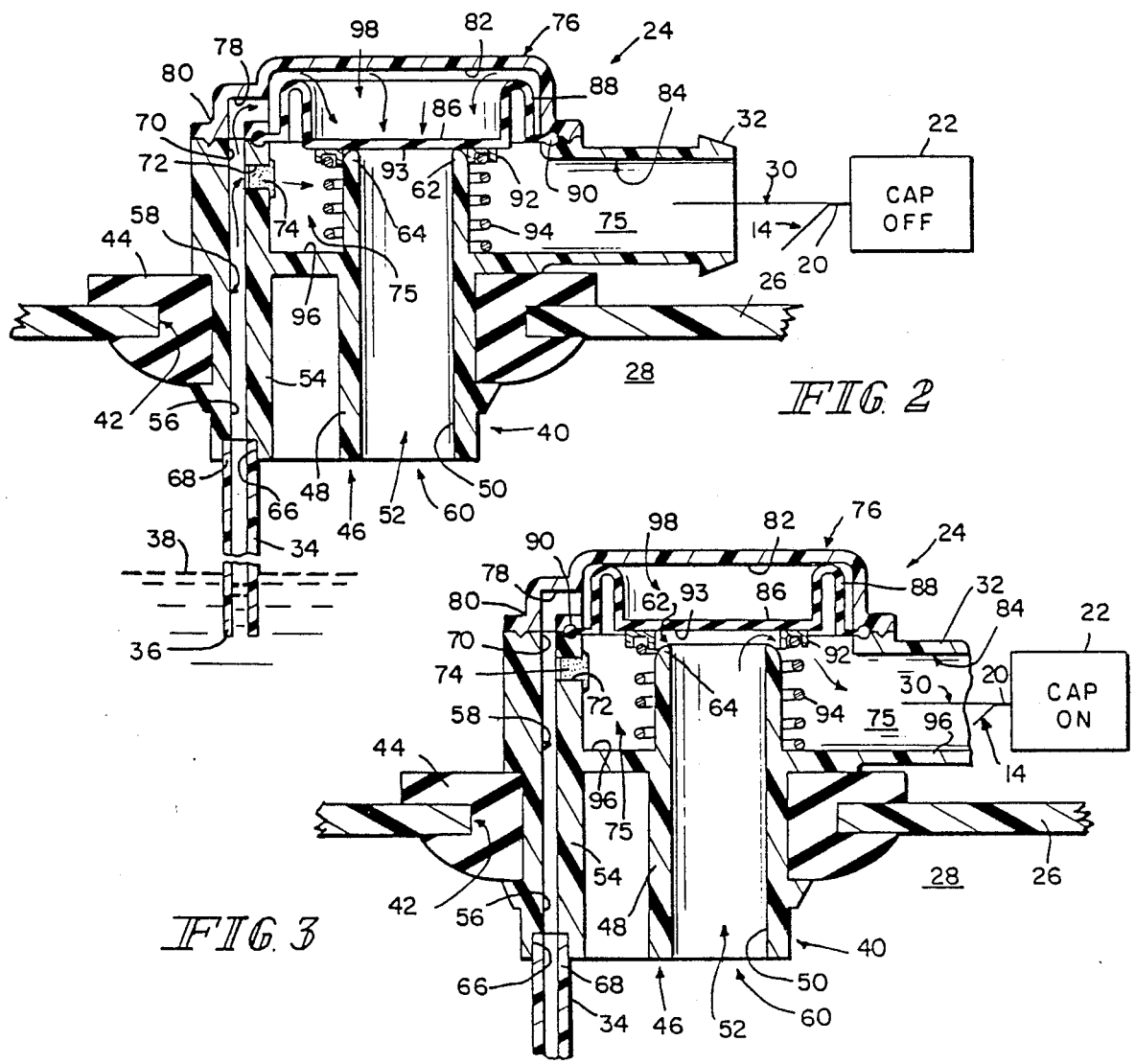
FIG. 2
FIG. 3

TANK PRESSURE CONTROL SYSTEM

BACKGROUND AND SUMMARY OF THE INVENTION

The present invention relates to tank pressure control systems, and particularly to a system which automatically develops a predetermined pressure head in a fuel tank during refueling to prevent a fuel pump operator from overfilling the fuel tank. More particularly, the present invention relates to a valve system communicating with a fuel tank venting outlet for blocking fuel vapor flow through the venting outlet to a separate filler neck coupled to the fuel tank only during refueling to develop said predetermined pressure head while otherwise venting such flow to a pressure-vacuum relief cap on the filler neck during times other than refueling.

Vehicle fuel systems are known to include pressure-relief valves mountable on either fuel tanks or filler necks. These conventional valves are not equipped to regulate the volume of fuel introduced into the vehicle fuel system during refueling. Although fuel pump nozzles are known to include sensor means for shutting off the flow of fuel from the nozzle when the fuel tank is nearly filled, it has been observed that users frequently manually override or bypass such fill-limiting sensors by continuing to pump fuel after the pump nozzle has automatically shut off several times. It will be appreciated that such unauthorized refueling practices can result in overfilling the fuel tank which can effectively reduce the fuel vapor expansion capacity available within the filled fuel tank.

An improved tank pressure control system is provided for maintaining a head pressure within the fuel tank which exceeds the maximum head pressure that can develop in the filler neck due to filling the filler neck with fuel. The improved control system advantageously aids in preventing fuel pump operators from overfilling fuel tanks by providing a pressurized fuel vapor barrier within the fuel tank that acts to block the introduction of fuel into the fuel tank in excess of a predetermined fuel capacity during refueling.

At the same time, the improved system is adapted to release fuel vapor in periods other than during refueling to increase the flow of fuel vapor to, for example, the atmosphere under the control of a pressure-relief fuel cap or the like. Such a timely release of fuel vapor from the fuel tank minimizes the risk that an excessive pressure buildup will occur in the tank during vehicle operation and drive a surge of liquid fuel through the filler neck to impinge the fuel cap and thereby avoid shortcomings of known fuel tank pressure control systems.

According to the present invention, an apparatus is provided for controlling discharge of fuel vapor from a fuel tank having a filler neck during refueling. The apparatus includes means for conducting fuel vapor between the fuel tank and a distal portion of the filler neck, means for selectively blocking flow of fuel vapor through the conducting means, and means for yieldably biasing the blocking means away from a flow-blocking position to a flow-delivery position.

The apparatus further includes means defining a venting control chamber in communication with the blocking means for using liquid fuel in the fuel tank to develop a pressure head in the venting control chamber having a magnitude in excess of a predetermined threshold level. The pressure head in the venting control chamber exerts a closing force on the blocking means in opposition to the biasing means so that the blocking means is moved from its normal flow-delivery position to its flow-blocking position. Such flow-blocking action prevents discharge of pressurized fuel vapor in the tank to the filler neck through the conducting means to aid in developing a pressure head in the fuel tank which prevents intentional or inadvertent overfilling of the tank.

In preferred embodiments, the venting control chamber is situated outside of the fuel tank and the using means further includes means extending into the fuel tank for communicating liquid fuel from the fuel tank toward the venting control chamber. In one embodiment, the communicating means is positioned outside of the conducting means, while, in another embodiment, the communicating means extends through the conducting means. In each case, the mixture of air and fuel vapor present in the venting control chamber is compressed as a result of continuing communication of more and more liquid fuel toward the venting control chamber as the volume of liquid fuel in the tank increases during refueling. Such compression raises the pressure in the venting control chamber sufficiently to impose a closure-inducing force on the blocking means in opposition to the biasing means.

Also in preferred embodiments, the fuel tank is formed to include a venting outlet separate from the filler neck. The conducting means includes a vent housing extending through the venting outlet into the fuel tank and partition means for dividing the vent housing into an inner chamber communicating with the fuel tank and an outer chamber communicating with the filler neck. A seal is established in the venting outlet between the vent housing and the fuel tank. The partition means includes a valve seat having an inner edge defining a venting aperture interconnecting the inner and outer chambers.

The blocking means includes a valve member formed to include means for sealingly engaging the valve seat to block flow of fluid through the venting aperture between the fuel tank and the filler neck. In one of the embodiments, the communicating means is formed within the vent housing itself, while in another of the embodiments the valve member is formed to include a central aperture coupled to the communicating means so that the communicating means moves in unison with the valve member and pressurized fuel vapor is communicable from the fuel tank to the venting control chamber via the communicating means.

In each embodiment, the communicating means provides a pressure transmission passage interconnecting the fuel tank and the venting control chamber in fluid communication. An inlet is formed and situated for admitting liquid fuel into the pressure transmission passage in proportion to the volume of liquid fuel in the fuel tank in excess of a first predetermined volume. As a result, the pressure in the pressure transmission passage and the venting control chamber will increase in response to continued admission of liquid fuel into the pressure transmission passage as the volume of liquid fuel in the fuel tank increases over and above the first predetermined volume.

A first outlet of the pressure transmission passage communicates pressure extant in the passage to the venting control chamber at a first predetermined rate to permit development of a pressure head in the chamber sufficient to move the blocking means against the biasing means to a flow-blocking position. A second outlet of the pressure transmission passage communicates pressure extant in the passage to the conducting means at a second predetermined rate.

A porous element is provided in the second outlet to impede the flow of liquid fuel through the second outlet means and restrict transmission of pressure from the pressure transmission passage to the conducting means. Such restriction will cause the second predetermined rate of pressure discharged through the first passage outlet to be less than the first predetermined rate of pressure discharged through the first passage outlet so that a pressure head sufficient to move the blocking means to its flow-blocking position develops in the venting control chamber. Such a movement-inducing pressure head is developed in the tank in response to accumulation of liquid fuel in excess of a second predetermined volume which is greater than the first predetermined volume.

One feature of the present invention is the provision of vent control means for using liquid fuel in the fuel tank to develop a pressure head in a venting control chamber communicating with the means for selectively blocking flow of fuel between the fuel tank and its filler neck. A steadily increasing volume of liquid fuel is admitted into a pressure transmission passage communicating with the venting control chamber as the level of liquid fuel into the tank rises above a certain threshold level during refueling. This steadily increasing volume acts to compress the mixture of air and fuel vapor in the venting control chamber, thereby causing the blocking means to move from its normal flow-delivery position to its flow-blocking position.

Advantageously, closure of the means for conducting fuel vapor from the fuel tank to the filler neck by the blocking means in accordance with this "vent control" feature establishes a trapped vapor volume in the tank above the liquid fuel level and the fluid connection point of the tank and filler neck. Such a trapped vapor volume provides a pressure barrier which acts to prevent introduction of additional liquid fuel into the tank through the filler neck, thereby preventing a fuel pump operator from inadvertently or intentionally manipulating the pump nozzle control to overfill the fuel tank.

Another feature of the present invention is the provision of the porous element in the second outlet of the pressure transmission passage to "bleed" pressure gradually from the venting control chamber to the conducting means. Although such bleeding is not significant enough to prevent development of sufficient pressure in the venting control chamber during refueling to move the blocking means to its flow-blocking position, it is significant enough, over time, to release the built-up pressure in the venting control chamber sufficiently during periods in which no liquid fuel is being dispensed into the fuel tank to enable the blocking means to be moved by the biasing means to resume its normal flow-delivery position.

This "pressure bleeding" feature advantageously permits fuel vapor in the fuel tank to be vented to the filler neck for possible subsequent distribution to the atmosphere under the control of a pressure-relief valve in a fuel cap on the filler neck unless the cap is removed and refueling is underway. Advantageously, such a tank overfill-limiting valve system does not block venting of fuel vapors from the fuel tank during periods before and after refueling. In other words, the tank venting system is in operation during all running conditions of the vehicle carrying the specially equipped fuel tank while the cap is installed in its filler neck-closing position. One benefit of such venting is that the risk of excessive pressure buildup in the fuel tank resulting in a surge of liquid fuel from the tank against the fuel cap through the filler neck during vehicle operation is minimized.

Additional objects, features, and advantages of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which:

FIG. 1 is a diagrammatic view of a vehicle fuel system incorporating an embodiment of the present invention therein;

FIG. 2 is a sectional detail view of one embodiment of an apparatus in accordance with the present invention showing closure of the blocking means during refueling while the fuel cap is off the filler neck;

FIG. 3 is a view of the embodiment illustrated in FIG. 2 showing the blocking means in its opened, flow-delivery position while the fuel cap is on the filler neck following bleeding of pressure that had built up in the venting control chamber during refueling into the conducting means through the porous element;

DETAILED DESCRIPTION OF THE DRAWINGS

Figure 4:
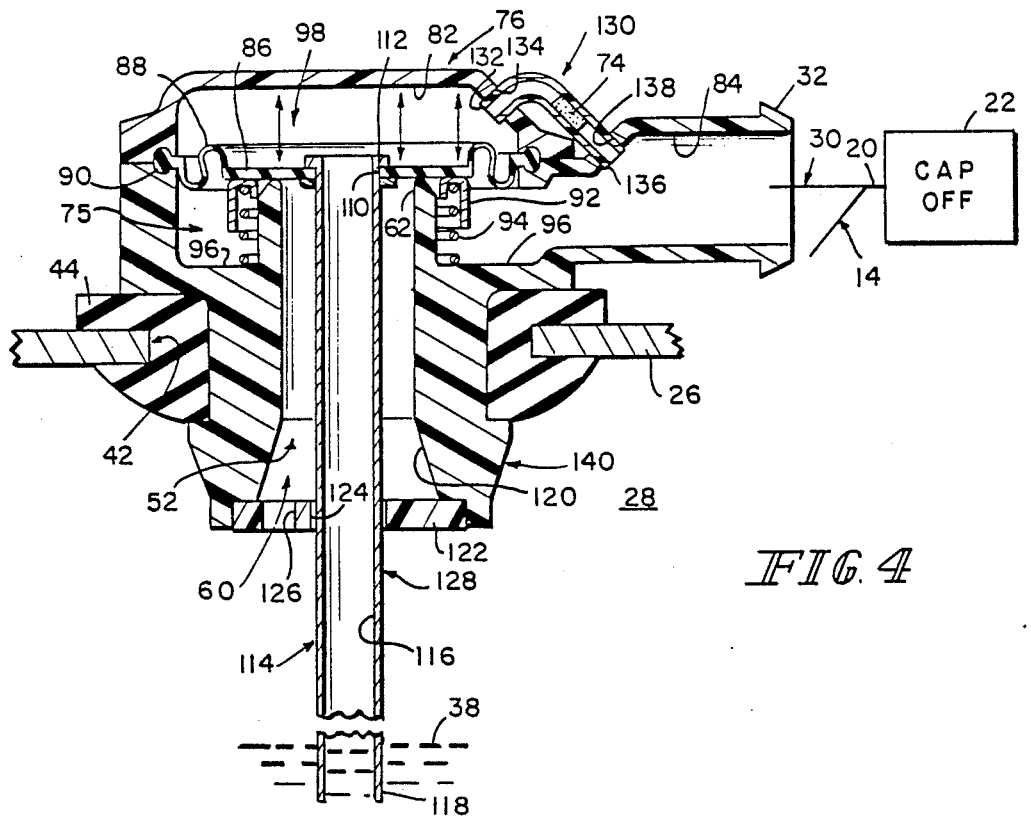
FIG. 4 is a sectional detail view of another embodiment of the present invention showing closure of the blocking means during refueling while the fuel cap is off the filler neck.

The tank pressure control system 10 of the present invention normally vents the top of a fuel tank to an outer portion of the tank filler neck to relieve unwanted excess tank pressure yet operates automatically during refueling to close the tank vent and trap fuel vapor in the tank to permit sufficient fuel vapor pressure to develop in the tank, causing liquid fuel to back up the filler neck and shut off the fuel-dispensing nozzle at the proper time. Therefore, the control system advantageously provides both a tank vent system and a tank overfill prevention system.

A preferred embodiment of control system 10 is illustrated in FIG. 1 in a vehicle fuel system including a fuel tank 12 and a filler neck 14 having a proximal portion 16 connected to the fuel tank 12 at junction 18 and a distal portion 20 defining a mouth and supporting a fuel cap 22. Specifically, control system 10 includes a valve assembly 24 mounted in a top wall 26 of tank 12 in communication with the vapor space 28 in the tank 12 and a vapor hose 30 interconnecting a vapor discharge outlet 32 of valve assembly 24 and the distal portion 20 of filler neck 14 in the vicinity of the filler neck mouth. An extension tube 34 depends from valve assembly 24 and is situated so that its inlet aperture 36 is able to communicate with liquid fuel 38 contained in tank 12.

Valve assembly 24 includes a vent housing 40 mounted in a venting outlet 42 formed in the top wall 26 of tank 12 as shown best in FIGS. 2 and 3. A gasket 44 is installed in venting outlet 42 to establish a fuel vapor seal between vent housing 40 and top wall 26. Vent housing 40 is preferably molded of plastic to provide the vapor discharge outlet 32.

Vent housing 40 is molded to include an interior structure 46 which divides the hollow interior of vent housing 40 into a plurality of passages and recesses as shown in FIGS. 2 and 3. Structure 46 includes a first vertical member 48 that cooperates with a first inner wall 50 of vent housing 40 to define inner chamber 52 therebetween and a second vertical member 54 that cooperates with a second inner wall 56 of vent housing 40 to define pressure transmission passage 58 therebetween.

Inner chamber 52 has an axially inner opening 60 at one end communicating with the vapor space 28 in the fuel tank 12 and, at its opposite end, has an axially outer opening 62 defined by an inner edge of valve seat 64. Member 48 and wall 50 are preferably configured to form inner chamber 52 as a cylindrical space.

Pressure transmission passage 58 is tubular in shape and has an inlet 66 for receiving the outlet end 68 of extension tube 34 as shown in FIGS. 2 and 3. A first outlet 70 of passage 58 is formed on the top side of vent housing 40 and a second outlet or bleed aperture 72 of passage 58 is formed in an axially upper portion of second vertical member 54. A porous element 74 made of sintered powdered metal is securely positioned in second outlet 72 to impede flow of liquid fuel therethrough and to restrict transmission of pressure therethrough in comparison to transmission through first outlet 70. All air and fuel vapor conducted through second outlet 72 is discharged into an outer chamber 75 formed in vent housing 40 in part by interior structure 46, which outer chamber 75 communicates with discharge outlet 32.

A control chamber cover 76 is formed to include an elbow conduit 78 and an outer rim 80. Outer rim 80 is affixed to the top of vent housing 40 so that elbow conduit 78 is positioned to communicate with the first outlet 70 of pressure transmission passage 58. Interior wall 82 of cover 76 cooperates to provide a sealed passage interconnecting elbow conduit 78, the axially outer opening 62 of inner chamber 52, outer chamber 75, and a fluid-conducting passageway 84 of vapor discharge outlet 32 in fluid communication.

A valve member 86 is situated inside the hollow cavity defined by cover 76 and supported by an annular flexible diaphragm 88. Diaphragm 88 has an inner edge affixed to the outer circumference of valve member 86 and an outer edge provided with a mounting bead 90 sandwiched between outer rim 80 of cover 76 and vent housing 40. An annular support member 92 is affixed to the bottom wall 93 of valve member 86 and configured to surround the cylindrical fixture provided by member 48 and wall 50 when valve member 86 is moved to engage valve seat 64 as shown in FIG. 2.

A coiled compression spring 94 is provided in vent housing 40 to urge the bottom wall 93 of valve member 86 away from a flow-blocking position against valve seat 64 (see FIG. 2) toward a flow-delivery position away from valve seat 64 (see FIG. 3). Spring 4 acts between the bottom wall 93 of valve member 86 and an axially outwardly facing surface 96 provided by interior structure 46 and vent housing 40 as shown in FIGS. 2 and 3.

The control chamber cover 76 encompasses valve member 86 and flexible diaphragm 88 to define a venting control chamber 98 therebetween. All air and fuel vapor distributed to venting control chamber 98 is supplied by pressure transmission passage 58 via elbow conduit 78 because of the air and fuel vapor seal established around the circumference of valve members 86 by flexible diaphragm 88. Thus, it will be understood that the volume of venting control chamber 98 expands in response to movement of valve member 86 toward its flow-blocking position against valve seat 64 and contracts in response to movement of valve member 86 away from its flow-blocking position.

The state of valve assembly 24 just prior to removal of cap 22 from filler neck 14 to initiate a refueling activity is illustrated in FIG. 3. Spring 94 biases valve member 86 away from valve seat 64 to its normal flow-delivery position wherein any fuel vapor in vapor space 28 is free to flow to the distal portion 20 of filler neck 14 via inner chamber 52, outer chamber 75, fluid-conducting passageway 84 in discharge outlet 32, and vapor hose 30. It is this valve-opened position which permits excessive pressure in the fuel tank 12 to be vented to the distal portion 20 of filler neck 14 via vapor hose 30 for distribution to the atmosphere under the control of a pressure-relief valve (not shown) in fuel cap 22. This venting function advantageously diffuses excess pressure built up in the fuel tank 12 to prevent such pressure from propelling a surge of liquid fuel up the filler neck 14 while cap 22 is tightly fastened thereto.

Upon removal of cap 22 from filler neck 14, the pressure in vapor space 28, pressure transmission passage 58, venting control chamber 98, inner chamber 52, and outer chamber 75 will be substantially atmospheric when tank 2 is empty or nearly empty. This pressure balance on valve member 86 allows spring 94 to continue urging valve member 86 to its flow-delivery position as shown in FIG. 3. As liquid fuel is dispensed through filler neck 14 into tank 12 by a fuel pump operator, the level of liquid fuel 38 in tank 12 will begin to rise. Eventually, liquid fuel 38 will enter inlet aperture 36 and rise up within extension tube 34 compressing the mixture of air and fuel vapor in pressure transmission passage 58.

Although some of the pressurized air and fuel vapor mixture destined for venting control chamber 98 will be exhausted to outer chamber 75 through second outlet 72 in passage 58, such exhaustion is restricted by porous element 74 so that sufficient pressure will develop in venting control chamber 98 upon accumulation of a predetermined volume of liquid fuel in tank 12 to move the valve member 86 against spring 94 from its flow-delivery position shown in FIG. 3 to its flow-blocking position shown in FIG. 2. Thus, as tank 12 is filled during refueling, liquid fuel admitted into extension tube 34 builds a progressively larger and larger pressure head in the venting control chamber 98. This pressure head forces the valve member 86 down against the valve seat 64 at the top of inner chamber 52 to block further flow of fuel vapor to the outer chamber 75 for distribution to vapor hose 30.

At this stage of the refueling operation, the pressure in the vapor space 28 and inner chamber 52 is slightly lower than the pressure in pressure transmission passage 58 and the pressure in the outer chamber 75 is still about atmospheric because cap 22 is still removed from filler neck 14. Fuel vapor in vapor space 28 is trapped in tank 12 because valve member 86 is closed t block discharge through the valve assembly 24 and the junction 18 of the filler neck 14 and the tank 12 is submerged. This trapped vapor volume functions to provide a pressure head or barrier which effectively blocks introduction of any more liquid fuel 38 into tank 12 because there is no where for the fuel vapor to go. Advantageously, this system operates to prevent overfilling of tank 12 because liquid fuel backs up filler neck 14 and shuts off the fuel-dispensing nozzle to complete the tank filling operation.

The next step in the refueling sequence is to reinstall fuel cap 22 on filler neck 14. Pressure in outer chamber 75 and inner chamber 52 will be equalized after a short period of time because the outlet to the atmosphere through the mouth of filler neck 14 has been closed by cap 22. The pressure head developed in venting control chamber 98 will be dissipated gradually as the mixture of air and fuel vapor contained therein is vented through the porous element 74 in the second outlet 72 to the outer chamber 75. After a short period of time, the pressure in venting control chamber 98 will be reduced sufficiently to permit spring 94 to, once again, urge valve member 86 to its flow-delivery position away from valve seat 64, thereby advantageously permitting excessive pressure built up in vapor space 28 to exit tank 12 through valve assembly 24 before it can act to force liquid fuel from the tank 12 into the filler neck 14 toward the tightened cap 22. Thus, valve assembly 24 permits fuel vapor in the tank 12 to be vented to the atmosphere during all vehicle running conditions and automatically blocks such venting only during refueling to prevent overfilling of tank 12.

Figure 5:
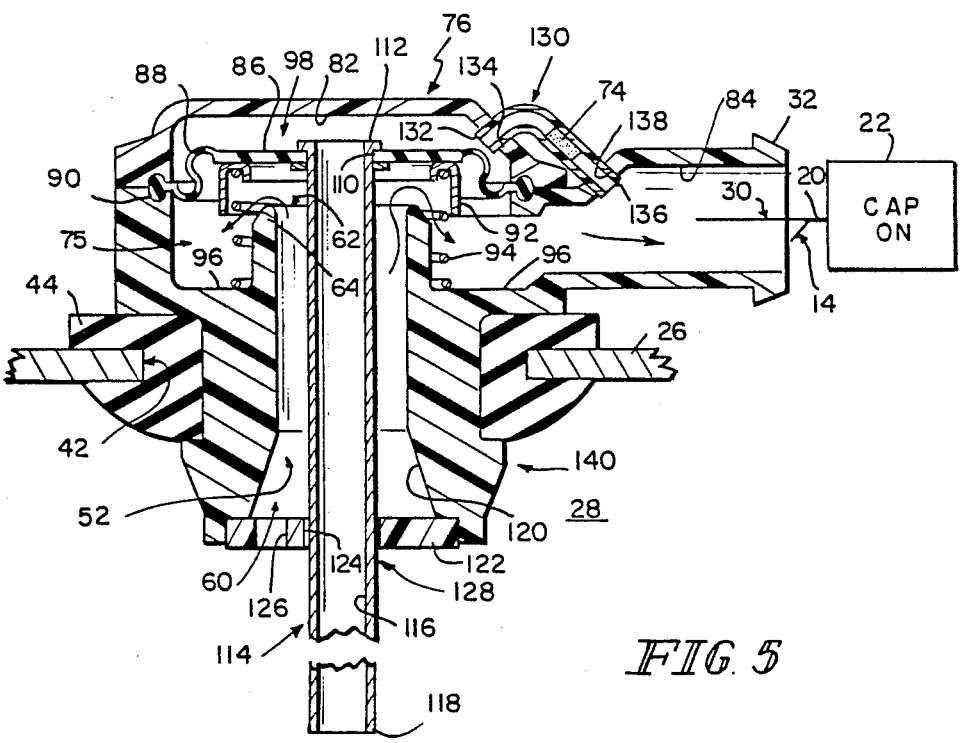
FIG. 5 is a view of the embodiment illustrated in FIG. 4 showing the blocking means in its opened, flow-delivery position while the fuel cap is on the filler neck following bleeding of pressure that had built up in the venting control chamber during refueling into the conducting means through the porous element.

FIGS. 4 and 5 show another embodiment of the invention that is a modification of the embodiment shown in FIGS. 2 and 3. Those elements referenced by numerals identical to those in FIGS. 2 and 3 perform the same or similar function. The principal differences in the second embodiment as compared to the first embodiment include the relocation of the pressure transmission passage to a position inside inner chamber 52 and extending through the valve member itself and the relocation of the porous element to a tube directly interconnecting the venting control chamber 98 and the fluid-conducting passageway 84 in the discharge outlet 32.

Referring now to FIGS. 4 and 5, valve member 86 is formed to include a central aperture 110 for receiving the outlet end 112 of extension tube 114 which provides pressure transmission passage 116 therein and terminates in the vapor space 28 at inlet aperture 118. In this embodiment, vent housing 140 is configured to include an interior wall 120 which defines inner chamber 52. Vent housing 140 also incorporates the interior structure 46 shown in FIGS. 2 and 3 since the extension tube 114 provides the pressure transmission passage 116 in a location within the inner chamber 52 instead of in a separate portion of the vent housing 140 itself.

A guide plate 122 formed to include a tube-receiving aperture 114 and at least one vent hole 126 is mounted to the vent housing 140 near its axially inner opening 60 to guide and stabilize a distal portion 128 of extension tube 114 and allow fuel vapor in vapor space 28 to enter inner chamber 52. Although extension tube 114 moves up and down in vent housing 140 and through guide plate 122 in response to movement of valve member 86 between its flow-blocking position in FIG. 4 and its flow-delivery position in FIG. 5, it nevertheless admits liquid fuel 38 and transmits pressure to venting control chamber 98 in the same fashion as extension tube 34, pressure transmission passage 58, and elbow conduit 78 as shown in the embodiment of FIGS. 2 and 3.

A bleed tube 130 has an inlet end 132 inserted into an outlet aperture 134 formed in control chamber cover 76 and an outlet end 136 inserted into an inlet aperture 138 formed in discharge outlet 32. The porous element 74 is lodged inside bleed tube 130 and functions in the same manner as in the embodiment of FIGS. 2 and 3. A more direct pressure-bleeding path from venting control chamber 98 to the fluid-conducting passageway 84 is established in this embodiment because of the configuration and location of bleed tube 130.

In operation, the embodiment of FIGS. 4 and 5 is functionally equivalent to the embodiment of FIGS. 2 and 3. Pressure transmission passage 116 admits liquid fuel 38 during a tank-filling operation to compress the mixture of air and gas in venting control chamber 98 to actuate valve member 86, thereby blocking discharge of excess fuel vapor in vapor space 28 to the atmosphere. Later, after the cap 22 is reinstalled, excess pressure developed in the venting control chamber 98 is gradually dissipated to the discharge outlet 32 via the bleed tube, thereby permitting spring 94 to return the valve member 86 to its flow-delivery position shown in FIG. 5.

Although the invention has been described in detail with reference to certain preferred embodiments, variations and modifications exist within the scope and spirit of the invention as described and defined in the following claims.

What is claimed is:

1. An apparatus for controlling discharge of fuel vapor from a fuel tank having a filler neck during refueling, the apparatus comprising
    means for conducting fuel vapor between the fuel tank and a distal portion of the filler neck,
    means for selectively blocking flow of fuel vapor through the conducting means, the blocking means being operable between a flow-blocking position and a flow-delivery position,
    means for yieldably biasing the blocking means away from its flow-blocking position to a flow-delivery position, and
    means defining a venting control chamber in communication with the blocking means for using liquid fuel in the fuel tank to develop a pressure head in the venting control chamber having a magnitude in excess of a predetermined threshold level to exert a closing force on the blocking means in opposition to the biasing means so that the blocking means is moved to its flow-blocking position, thereby preventing discharge of pressurized fuel vapor in the tank to the filler neck through the conducting means.

2. The apparatus of claim 1, wherein the venting control chamber is situated outside of the fuel tank, the using means further includes means extending into the fuel tank for communicating liquid fuel from the fuel tank toward the venting control chamber, and the communicating means is positioned outside of the conducting means.

3. The apparatus of claim 2, wherein the using means further includes means interconnecting the communicating means and the conducting means for bleeding pressure from the venting control chamber at a predetermined rate.

4. The apparatus of claim 1, wherein the venting control chamber is situated outside of the fuel tank and the using means further includes means extending through the conducting means into the fuel tank for communicating liquid fuel from the fuel tank toward the venting control chamber.

5. The apparatus of claim 4, wherein the using means further includes means interconnecting the venting control chamber and the conducting means for bleeding pressure from the venting control chamber at a predetermined rate.

6. The apparatus of claim 1, wherein the fuel tank is formed to include a venting outlet separate from the filler neck and the conducting means extends through the venting outlet.

7. The apparatus of claim 6, wherein the conducting means includes a vent housing extending through the venting outlet into the fuel tank, means for establishing a seal in the venting outlet between the vent housing and the fuel tank, and partition means for dividing the vent housing into an inner chamber communicating with the fuel tank and an outer chamber communicating with the filler neck, the partition means includes a valve seat having an inner edge defining a venting aperture interconnecting the inner and outer chambers, and the blocking means includes a valve member formed to include means for sealingly engaging the valve seat to block flow of fluid through the venting aperture between the fuel tank and the filler neck.

8. The apparatus of claim 7, wherein the blocking means is formed to include a central aperture coupled to the using means so that pressurized fuel vapor is communicable from the fuel tank to the venting control chamber via the using means.

9. The apparatus of claim 7, wherein the blocking means is situated to provide an interface between the outer chamber and the venting control chamber, the blocking means further includes a support member situated within the outer chamber and affixed to the valve member, and the biasing means is positioned in the outer chamber to act between the partition means and the support member.

10. The apparatus of claim 1, wherein the using means includes passageway means for defining a pressure transmission passage interconnecting the fuel tank and the venting control chamber in fluid communication and the passageway means is formed to include inlet means for admitting liquid fuel into the pressure transmission passage in proportion to the volume of liquid fuel in the fuel tank upon accumulation in the fuel tank of liquid fuel in excess of a first predetermined volume so that pressure in the pressure transmission passage and the venting control chamber increases in response to continued admission of liquid fuel into the pressure transmission passage as the volume of liquid fuel in the fuel tank increases.

11. The apparatus of claim 10, wherein the passageway means is further formed to include first outlet means for communicating pressure extant in the pressure transmission passage to the venting control chamber at a first predetermined rate, second outlet means for communicating pressure extant in the pressure transmission passage to the conducting means at a second predetermined rate, and means in the second outlet means impeding the flow of liquid fuel through the second outlet means for restricting transmission of pressure from the pressure transmission passage to the conducting means causing the second predetermined rate to be less than the first predetermined rate so that a pressure head sufficient to move the blocking means to its flow-blocking position develops in response to accumulation of liquid fuel in excess of a second predetermined volume greater than the first predetermined volume.

12. An apparatus for controlling discharge of fuel vapors from a fuel tank having a filler neck during refueling, the apparatus comprising
means for conducting fuel vapor between the fuel tank and a distal portion of the filler neck,
means for selectively blocking flow of fuel vapor through the conducting means, the blocking means being operable between a flow-blocking position and a flow-delivery position, the blocking means including an extension tube extending through the conducting means to communicate with liquid fuel in the fuel tank and valve means coupled to the extension tube for sealingly engaging the conducting means upon movement of the blocking means to its flow-blocking position,
means for yieldably biasing the blocking means toward its flow-delivery position,
means for encompassing the valve means to define a venting control chamber therebetween having a volume that expands in response to movement of the blocking means toward its flow-blocking position and contracts in response to movement of the blocking means away from its flow-blocking position, and
means for using liquid fuel in the fuel tank to develop a pressure head having a pressure in excess of a predetermined threshold level in the venting control chamber to exert a closing force on the valve means in opposition to the biasing means so that the blocking means is moved to its flow-blocking position, thereby permitting discharge of pressurized fuel vapor in the tank to the filler neck through the conducting means.

13. The apparatus of claim 12, wherein the conducting means includes a hollow housing formed to include a top opening, the encompassing means includes a cover member affixed to the housing to close the top opening, the valve means is sealingly coupled to the cover member for movement relative to the cover member to define the venting control chamber therebetween, the extension tube moves in unison with the valve means, and the movable valve means and the extension tube operate to define means for selectively establishing fluid communication between the fuel tank and the venting control chamber so that fuel tank pressure in excess of the predetermined threshold level developed in the venting control chamber by liquid fuel entering the extension tube from the fuel tank during refueling acts upon the valve means to apply a movement-inducing force in opposition to force provided by the biasing means sufficient to move the valve means into sealing engagement with the conducting means to establish the flow-blocking position of the blocking means.

14. The apparatus of claim 12, wherein the using means further includes means for bleeding pressure from the venting control chamber at a predetermined rate causing the magnitude of pressure in the venting control chamber progressively to decrease upon cessation of an increase in the height of liquid fuel in the extension tube to reduce the magnitude of the movement-inducing force applied to the valve means without substantially lowering the magnitude of the movement-inducing force developed by pressure in the venting control chamber during an increase in the height of liquid fuel in the extension tube so that the force applied to the valve means by the biasing means is sufficient to move the valve means toward sealing engagement with the conducting means, thereby establishing the flow-blocking position of the blocking means.

15. The apparatus of claim 14, wherein the fuel tank is formed to include an outlet aperture, the conducting means is mounted in the outlet aperture and includes a partition member and means for establishing a seal between the fuel tank and the partition member, the partition member includes an annular valve seat having an inner edge defining a venting aperture, the valve means is movable between a closing position sealingly engaging the valve seat and opening positions away from the valve seat, and the biasing means acts between the partition member and the valve means.

16. A system for handling fuel vapors from a vehicle fuel system, the vehicle fuel system including a fuel tank having a filler neck, the system comprising
    means for conducting fuel vapor between the fuel tank and a distal portion of the filler neck,
    means for selectively blocking flow of fuel vapor through the conducting means, the blocking means being actuable between a flow-blocking condition and flow-delivery condition,
    means for containing pressure in a predetermined region communicating with the blocking means and permitting pressure to exert a closure-inducing force on the blocking means causing the blocking means to change to its flow-blocking condition, thereby blocking discharge of fuel vapor in the fuel tank to the filler neck via the conducting means, and
    means for increasing the pressure in the predetermined region in response to accumulation of liquid fuel in the fuel tank in excess of a predetermined volume.

17. The system of claim 16, wherein the blocking means is formed to include a portion of the increasing means.

18. The system of claim 16, further comprising means for yieldably biasing the blocking means toward its flow-delivery position as long as the magnitude of pressure in the predetermined region remains less than a predetermined maximum pressure.

19. The system of claim 16, wherein the conducting means includes a vent housing extending into the fuel tank, means for establishing a seal between the vent housing and the fuel tank, and partition means for dividing the vent housing into an inner chamber communicating with the fuel tank and an outer chamber communicating with the filler neck, the partition means includes a valve seat having an inner edge defining a venting aperture interconnecting the inner and outer chambers and the blocking means includes a valve member formed to include means for sealingly engaging the valve seat to block flow of fluid through the venting aperture between the fuel tank and the filler neck.

20. The system of claim 19, wherein the blocking means is formed to include a central aperture coupled to the increasing means so that pressurized fuel vapor is communicable from the fuel tank to the predetermined region via the increasing means.

21. The system of claim 19, further comprising means for Yieldably biasing the blocking means toward its flow-delivery position as long as the magnitude of pressure in the predetermined region remains less than a predetermined maximum pressure, and wherein the blocking means is situated to provide an interface between the outer chamber and the predetermined region, the blocking means further includes a support member situated within the outer chamber and affixed to the valve member, and the biasing means is positioned in the outer chamber to act between the partition means and the support member.

22. The system of claim 16, wherein the increasing means includes passageway means for defining a pressure transmission passage interconnecting the fuel tank and the predetermined region in fluid communication and the passageway means is formed to include inlet means for admitting liquid fuel into the pressure transmission passage in proportion to the volume of liquid fuel in the fuel tank upon accumulation in the fuel tank of liquid fuel in excess of a first predetermined volume so that pressure in the pressure transmission passage and the predetermined region increases in response to continued admission of liquid fuel into the pressure transmission passage as the volume of liquid fuel in the fuel tank increases.

23. The system of claim 22, wherein the passageway means is further formed to include first outlet means for communicating pressure extant in the pressure transmission passage to the predetermined region at a first predetermined rate, second outlet means for communicating pressure extant in the pressure transmission passage to the conducting means at a second predetermined rate, and means in the second outlet means impeding the flow of liquid fuel through the second outlet means for restricting transmission of pressure from the pressure transmission passage to the conducting means causing the second predetermined rate to be less than the first predetermined rate so that a pressure head sufficient to move the blocking means to its flow-blocking position develops in response to accumulation of liquid fuel in excess of a second predetermined volume greater than the first predetermined volume.

24. A system for regulating the introduction of fuel into a fuel tank, which tank has a filler neck and a separate venting outlet, through the filler neck to prevent overfilling of the fuel tank during refueling, the system comprising
    means communicating with the fuel tank for containing pressure in a predetermined region,
    means interconnecting the fuel tank and the containing means in fluid communication for increasing the pressure in the predetermined region in response to accumulation of liquid fuel in the fuel tank in excess of a predetermined volume, and
    means for using pressure in the predetermined region in excess of a predetermined pressure to maintain a predetermined pressure head in the fuel tank in excess of a maximum pressure head in the filler neck resulting from filling the filler neck with fuel during refueling, thereby controlling the pressure in the fuel tank to develop barrier means for blocking continued introduction of liquid fuel into the fuel tank upon accumulation of said predetermined volume.

25. The system of claim 24, wherein the increasing means is situated to extend through the venting outlet in the fuel tank.

26. The system of claim 24, wherein the using means includes means for conducting fuel vapor between the fuel tank and the filler neck via the venting outlet, means for selectively blocking flow of fuel vapor through the conducting means, the blocking means defining a boundary of the predetermined region and being movable from a flow-delivery position to a flow-blocking position in response to development of a pressure head in the predetermined region in excess of a predetermined magnitude to block discharge of pressurized fuel vapor through the conducting means.

27. The system of claim 26, wherein the containing means includes means for encompassing the blocking means to define the predetermined region therebetween so that the volume of the predetermined region expands in response to movement of the blocking means toward its flow-blocking position and contracts in response to movement of the blocking means away from its flow-blocking position.

28. The system of claim 25, wherein the increasing means includes passageway means for defining a pressure transmission passage interconnecting the fuel tank and the predetermined region in fluid communication and the passageway means is formed to include inlet means for admitting liquid fuel into the pressure transmission passage in proportion to the volume of liquid fuel in the fuel tank upon accumulation in the fuel tank of liquid fuel in excess of a first predetermined volume so that pressure in the pressure transmission passage and the predetermined region increases in response to continued admission of liquid fuel into the pressure transmission passage as the volume of liquid fuel in the fuel tank increases.

29. The system of claim 25, wherein the conducting means includes a vent housing extending into the fuel tank through the venting outlet, means for establishing a seal in the venting outlet between the vent housing and the fuel tank, and partition means for dividing the vent housing into an inner chamber communicating with the fuel tank and an outer chamber communicating with the filler neck, the partition means includes a valve seat having an inner edge defining a venting aperture interconnecting the inner and outer chambers and the blocking means includes a valve member formed to include means for sealingly engaging the valve seat to block flow of fluid through the venting aperture between the fuel tank and the filler neck.

30. The system of claim 24, further comprising means for venting pressure in the predetermined region at a controlled rate to the filler neck to prevent development of a maximum pressure head in the fuel tank upon temporary disablement of the increasing means resulting from at least one of stable and declining volume of liquid fuel in the fuel tank after conclusion of vehicle refueling.

31. The system of claim 30, wherein the increasing means defines a pressure transmission passage interconnecting the fuel tank and the predetermined region in fluid communication and having first outlet means for communicating pressure extant in the pressure transmission passage to the predetermined region at a first predetermined rate and second outlet means for communicating pressure extant in the pressure transmission passage to the conducting means at a second predetermined rate and the venting means includes means in the second outlet means impeding the flow of liquid fuel through the second outlet means for restricting transmission of pressure from the pressure transmission passage to the conducting means causing the second predetermined rate to be less than the first predetermined rate so that a pressure head sufficient to move the blocking means to its flow-blocking position develops in response to accumulation of liquid fuel in excess of a second predetermined volume greater than the first predetermined volume.

* * * * *

UNITED STATES PATENT AND TRADEMARK OFFICE
CERTIFICATE OF CORRECTION

PATENT NO. : 4,790,349

DATED : December 13, 1988

INVENTOR(S) : Robert S. Harris

It is certified that error appears in the above-identified patent and that said Letters Patent is hereby corrected as shown below:

On the bibliography page under the heading "U.S. PATENT REFERENCES", please delete "3,363,642" and insert therefor --3,363,641--;

At column 5, line 62, please delete "4" and insert therefor --94--;

At column 6, line 32, please delete "2" and insert therefor --12--; and

At column 6, line 66, please delete "t" and insert therefor --to--.

Signed and Sealed this

Twenty-fifth Day of April, 1989

Attest:

DONALD J. QUIGG

*Attesting Officer*      *Commissioner of Patents and Trademarks*